N. W. WILSON & A. W. BLYE.
Cans for Oils, &c.
No. 150,212. Patented April 28, 1874.
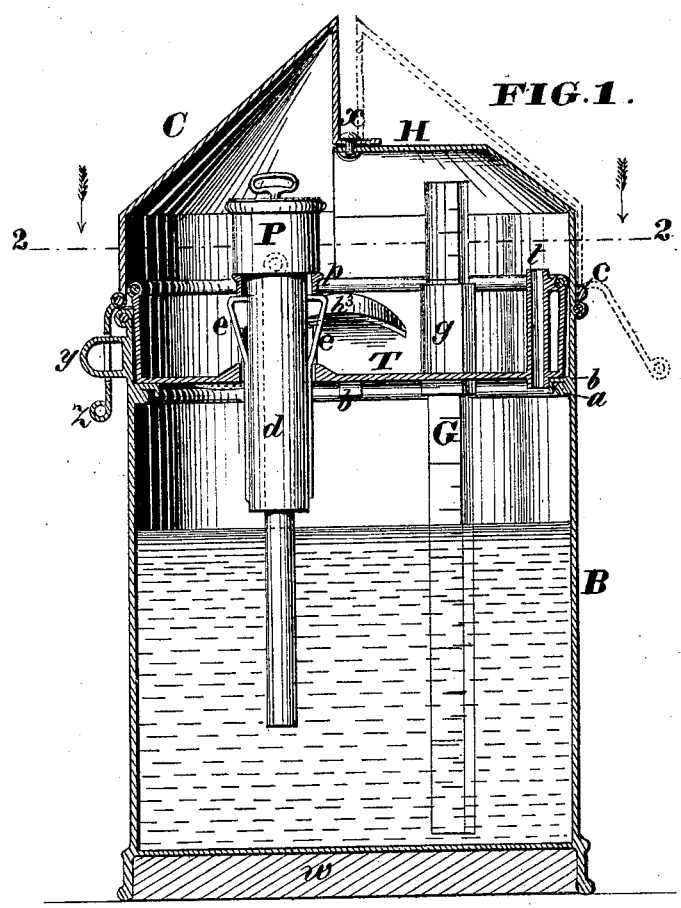
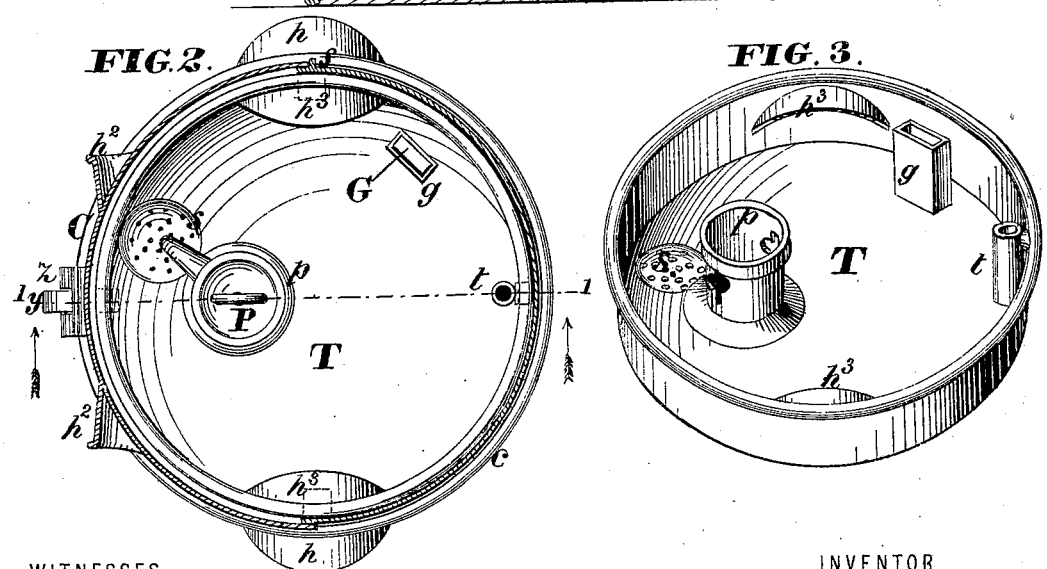
WITNESSES
Jas. L. Ewin
Walter Allen
INVENTOR
Newell W. Wilson
Alphonso W. Blye
By Knight &co Attorneys

UNITED STATES PATENT OFFICE.

NEWELL W. WILSON AND ALPHONSO W. BLYE, OF SYRACUSE, NEW YORK.

IMPROVEMENT IN CANS FOR OIL, &c.

Specification forming part of Letters Patent No. 150,212, dated April 28, 1874; application filed March 26, 1874.

*To all whom it may concern:*

Be it known that we, NEWELL W. WILSON and ALPHONSO W. BLYE, both of the city of Syracuse, and county of Onondaga, in the State of New York, have jointly invented an Improved Tank-Can for Oil, &c., of which the following is a specification:

This invention relates to that class of tank-cans employed by persons using or dealing in lard, coal or other oils, and other liquids, and in which each tank comprises a body or reservoir to hold a considerable quantity of the liquid, a pan or tray to contain the measures and other appurtenances, a pump for drawing the liquid, and a cover for inclosing the pump and tray when the tank is not in use. The present invention consists, first, in the combination of a body and cover of a peculiar construction, whereby a removable pan is accommodated, filling the entire top of the tank, while the mouth of the body is braced perfectly, and the cover opens in such manner as to require no extra space above, behind, or on either side of the can for its accommodation. The invention consists, secondly, in the combination of a circular body and a circular pan, filling the upper end of the body, and adapted to be rotated therein, so as to bring its contents successively to the front. The invention consists, thirdly, in the provision of this rotary circular pan with sockets for the pump, and for a gage-rod, and with a tube, by which the tank may be filled from the barrel without removing the pan. The invention consists, fourthly, in superior means for attaching, supporting, and securing a removable pump.

Figure 1 is a central vertical section of this improved oil-tank. Fig. 2 is a sectional plan view of the same. Fig. 3 is a perspective view of the pan. The lines 1 1, Fig. 2, and 2 2, Fig. 1, indicate, respectively, the plane of Figs. 1 and 2. The cover is represented as closed in full lines in Fig. 1, and in dotted lines as opened.

The body B of this tank is a cylindrical vessel, constructed of tin, zinc, or galvanized iron. The rear portion of the body is extended in height some ten inches, more or less, to form a fixed segmental hood, H, which closes the tank to this extent, and operates as a support and brace. The body is provided with customary handles $h\ h$, and has a heavy wooden bottom, $w$, in addition to and outside of its metallic bottom, the same being fitted within the marginal foot-flange of the tank. A sliding segmental cover, C, with a conical top for rigidity and symmetry, is fitted to the upper end of the tank for opening and closing the mouth of the same. The back of this cover is furnished with a horizontal flange to rest on the flat top of the hood H, and a central rivet or bolt, $x$, is applied to these parts to attach the cover, and to constitute a pivot. The lower edge of the cover is finished with a heavy iron rod, $c$, which is made continuous, so that it embraces the body, and affords lateral support in all positions of the cover. A pair of handles, $h^2$, provide for operating the cover, and a flange, $f$, on the hood arrests it in closed position. A central hasp, $z$, on the cover, and a staple, $y$, on the front of the can, provide for the application of a padlock to secure the contents against tampering. A heavy iron rod, $a$, and brackets $b$, projecting inward therefrom, are securely attached within the upper end of the body B; and a circular pan or tray, T, is supported thereon, so as to be rotary and removable. This pan, which may be about five inches deep, occupies the whole area of the top of the tank, and affords needful room for the storage of measures, &c., within the tank; while, by revolving it, its contents can readily be brought to the front, and, by removing it through the mouth of the tank, the tank may be thoroughly cleaned or repaired with facility. The pan has handles $h^3$, by which to lift it, and is provided with sockets $p\ g$ to receive a pump, P, and a gage-rod, G, respectively; and with a tube, $t$, through which the tank may be readily filled from the barrel, and with a strainer, $s$, for returning to the reservoir the drippings of the pump and any of the liquid which may be spilled in the pan. The pump proper may be of any approved pattern. It is held steadily in working position by a pair of spring-catches, $e$, engaging in orifices in the socket-neck $p$, which is properly braced. These catches are forced in to release the pump by the fingers of one hand applied thereto, and are attached to the pump, and received, as thus forced in, by a jacket, $d$, of sufficient diameter, which serves also to extend the support. The catches have inclined lower surfaces, so as to engage with the socket automatically. The gage-rod G is graduated to indicate the quantity of liquid in the tank. The pump and gage-rod are withdrawn when the pan is to be removed, or for inspection or repair. The pan rests entirely within the tank, and the cover closes upon the tank-body, irrespective of the presence or absence of the pan.

We are aware that the fixed hood and revolving segmental cover of our can are not our invention, and we hereby disclaim these features, except as combined with our circular removable pan.

The following is claimed as new, namely:

1. The combination, in a tank-can, of a circular body, B, having a metallic rod, $a$, extending around the same, within its upper end, to stiffen the can and form an internal flange, and a circular removable pan or tray, T, occupying the entire area of the upper end of the can, and supported within the same independently of the cover, substantially as herein shown and described.

2. The combination, in a tank-can, of a circular body, B, and a circular pan, T, adapted to be rotated therein, so as to bring its contents successively to the front, as herein set forth.

3. The rotary circular pan T, having the sockets $p$ $g$ for a pump and gage-rod, and the tube $t$ to provide for filling the tank without removing the pan, substantially as shown and described.

4. The pump P, provided with the jacket $d$ and spring-catches $c$, for supporting and securing the same, in combination with the pan T, having the orificed socket-neck $p$ for their reception, as specified.

NEWELL W. WILSON.
ALPHONSO W. BLYE.

Witnesses:
C. G. Hinkley,
S. A. Tuller.